(12) United States Patent
Schneider et al.

(10) Patent No.: US 11,582,380 B2
(45) Date of Patent: Feb. 14, 2023

(54) FOCUS MODULE

(71) Applicant: SICK AG, Waldkirch (DE)

(72) Inventors: Florian Schneider, Waldkirch (DE);
Tobias Pontiggia, Waldkirch (DE);
Jonathan Pfeil, Waldkirch (DE)

(73) Assignee: SICK AG, Waldkirch (DE)

( * ) Notice: Subject to any disclaimer, the term of this patent is extended or adjusted under 35 U.S.C. 154(b) by 192 days.

(21) Appl. No.: 17/080,428

(22) Filed: Oct. 26, 2020

(65) Prior Publication Data

US 2021/0152742 A1 May 20, 2021

(30) Foreign Application Priority Data

Nov. 15, 2019 (DE) .......................... 102019130963.8

(51) Int. Cl.
*H04N 5/232* (2006.01)
*G06K 7/10* (2006.01)
*G06K 7/14* (2006.01)
*H04N 5/225* (2006.01)

(52) U.S. Cl.
CPC ... *H04N 5/232121* (2018.08); *G06K 7/10841* (2013.01); *G06K 7/10861* (2013.01); *G06K 7/1413* (2013.01); *H04N 5/2253* (2013.01)

(58) Field of Classification Search
CPC .......... H04N 5/232121; H04N 5/2253; G06K 7/10841; G06K 7/10861; G06K 7/1413; G06K 7/10831; G01S 17/08; G02B 7/32; G03B 13/20
USPC ....... 348/348, 345, 335; 235/462.11, 462.23, 235/462.24, 462.32
See application file for complete search history.

(56) References Cited

U.S. PATENT DOCUMENTS

| | | | |
|---|---|---|---|
| 2004/0130978 A1* | 7/2004 | Hatazawa | G11B 7/0935 720/683 |
| 2010/0176319 A1 | 7/2010 | Nunnink et al. | |
| 2014/0262698 A1* | 9/2014 | Whitten | B65G 17/08 198/850 |
| 2016/0037051 A1 | 2/2016 | Tomosada et al. | |
| 2018/0007343 A1* | 1/2018 | Send | H04N 9/0451 |
| 2019/0011557 A1 | 1/2019 | Weber et al. | |
| 2019/0250364 A1 | 8/2019 | Schneider et al. | |

(Continued)

FOREIGN PATENT DOCUMENTS

| | | |
|---|---|---|
| DE | 102016112123 A1 | 1/2018 |
| DE | 102018102917 B3 | 1/2019 |
| DE | 102018103092 A1 | 8/2019 |

(Continued)

OTHER PUBLICATIONS

Office Action dated Jun. 29, 2020 issued in corresponding German Application No. 102019130963.8.

*Primary Examiner* — Edwyn Labaze
(74) *Attorney, Agent, or Firm* — Nath, Goldberg & Meyer; Jerald L. Meyer (57) ABSTRACT

A focus module for an optoelectronic sensor is provided that has a focus adjustable optics, a focus adjustment unit for varying a focal position of the optics, and a focus control to move the optics into a focal position corresponding to a distance value by means of the focus adjustment unit. The focus module here furthermore has a distance sensor for determining the distance value and the focus adjustment unit, the focus control, and the distance sensor are parts of the focus module.

13 Claims, 4 Drawing Sheets

(56) References Cited

U.S. PATENT DOCUMENTS

2019/0285833 A1    9/2019   Schneider et al.

FOREIGN PATENT DOCUMENTS

| | | |
|---|---|---|
| DE | 102018105301 A1 | 9/2019 |
| EP | 2498113 A1 | 9/2012 |
| EP | 3505961 A1 | 7/2019 |
| EP | 3525026 A1 | 8/2019 |
| JP | 2002207163 A | 7/2002 |
| JP | 201044166 A | 2/2010 |
| JP | 2019179236 A | 10/2019 |
| WO | 2010081060 A1 | 7/2010 |

* cited by examiner

FOCUS MODULE

The invention relates to a focusing device for an optoelectronic sensor that has a focus-adjustable optics, a focus adjustment unit for varying a focal position of the optics, a distance sensor for determining a distance value, in particular an optoelectronic distance sensor in accordance with the principle of the time of flight process, and a focus control to move the optics into a focal position corresponding to the distance value by means of the focus adjustment unit.

The focusing of an optics is a task that is required for a very large group of optoelectronic sensors. Depending on sensor type, this relates to the transmission side when a light beam is to be transmitted or when a light pattern is to be projected or to the reception side for the detection of light beams or even images. An example for a focusing at the transmission side is a barcode scanner having a focused reading beam; a further example for a focusing at the reception side is a camera for a focused taking of images. As a 3D camera with a projected illumination pattern illustrates, there is also a need for focusing both at the transmission side and at the reception side.

Cameras are used inter alia in industrial applications in a variety of ways to automatically detect object properties, for example for an inspection or a measurement of objects. In this respect, images of the object are taken and are evaluated in accordance with the task by image processing methods. A further use of cameras is the reading of codes. Objects with the codes located thereon are recorded using an image sensor and the code regions are identified in the images and are then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Despite this greater variety with camera-based readers, the specialized barcode scanners, that are as a rule less expensive with the same reading power, are still widely used. Typical areas of use of code readers are supermarket cash registers, automatic parcel identification, sorting of mail shipments, baggage handling at airports, and other logistic applications.

A frequent detection situation is the installation of a code reader or of a camera above a conveyor belt for inspection work or measurement work. The camera records images during the relative movement of the object stream on the conveyor belt and stores the detected information or instigates further processing steps in dependence on the object properties acquired. Such processing steps can comprise the further processing adapted to the specific object at a machine which acts on conveyed objects or a change to the object stream in that specific objects are expelled from the object stream as part of a quality control or the object stream is sorted into a plurality of partial object streams. The objects are identified by a code reader with reference to the applied codes for a correct sorting or similar processing steps.

The focal position must be set to be able to work with different working distances and in particular to be able to read codes at different distances. There are different technologies for this. Typically, the position of the object, that is the distance between the object and the image sensor, is changed to achieve a refocusing.

This is often done automatically with the aid of a stepper motor or a moving coil via a parallel guide or a thread.

EP 2 498 113 A1 proposes a focus adjustment for a camera-based code reader with the aid of a motor-powered cam plate and a parallel guide of the objective in a spring support. DE 10 2016 112 123 A1 discloses a barcode scanner having a transmission optics on a pivot arm that is pivoted for a focusing of the reading beam with a moving coil drive. A focus adjustment is presented in EP 3 525 026 A1 that provides an optics carrier that is movable by a moving coil drive in different focal positions and that rolls off on two leaf springs.

A camera and a method for focus adjustment are known from DE 10 2018 102 917 B3. The focal position of the reception optics can be changed by a rotational movement of a thread accessible from the outside. The camera comprises a distance measuring unit that measures distance values using a time of flight measurement, said distance values being displayed to find the required focal position. A check can moreover be made by means of a Hall sensor of when this focal position has been adopted.

DE 10 2018 105 301 A1 discloses a camera having an integrated distance sensor that receives a vertical profile. Different functions are thus supported which can also include a focus adjustment.

DE 10 2018 103 092 A1 deals with a focus setting display unit for a moving image camera. A graphical representation of the focus setting and of a frequency distribution of the distance values can thus be displayed in a spatial relationship with one another.

Devices have previously been used in said conveyor belt applications in which the focus units are fixedly installed. There are consequently device variants with and without a focus adjustment. Due to the great space requirements of the focus adjustment motor, the complex and expensive die cast housing has to be available in different variants. This means higher costs, a higher effort, and a lack of flexibility.

The fast focus adjustment is furthermore in particular based on an external measured signal in reading tunnels at conveyor belts. The geometry of the conveyed objects is for this purpose measured in advance by a separate laser scanner or the like. A corresponding device effort and coordination effort is required for this purpose.

US 2010/0176319 A1 discloses a modular focusing system for an image based code reader. Lens arrangements for a fixed focus, a manual focus, or a variable focus are thus selectively used. However, this relates solely to the optics. The variable focus still has to be controlled with the suitable focal position by the camera.

It is therefore the object of the invention to improve the focusing for an optoelectronic sensor.

This object is satisfied by a focus device for an optoelectronic sensor that has a focus-adjustable optics, a focus adjustment unit for varying a focal position of the optics, a distance sensor for determining a distance value, in particular an optoelectronic distance sensor in accordance with the principle of the time of flight process, and a focus control to move the optics into a focal position corresponding to the distance value by means of the focus adjustment unit. The focusing device is configured as an autonomous focus module, that takes care of the focusing independently of a control of the optoelectronic sensor in that focus adjustments are carried out independently, and can be retrofitted to the sensor by means of releasable connection elements or can be replaced with another focus module, with the focus adjustment unit, the focus control, and the distance sensor being parts of the focus module.

The focus module is designed such that the sensor can be retrofitted with it or such that one focus module can be replaced with another focus module. The focus module comprises a focus adjustable optics that can be designed in any form known per se, for example as a single lens or as an objective. A focus adjustment serves as an actuator for changing the focal position. The required controls take place by means of a focus control that provides that the optics is brought into a desired focal position with the aid of the focus adjustment, that is the depth of field range is placed around a specific distance value.

The invention starts from the basic idea that the focus module can autonomously set a situation-adapted focal position. A distance sensor is provided for this purpose that measures the distance, for example. from an object or from a code to be read. The distance sensor can work optically, preferably in accordance with the principle of the time of flight process. Such sensors are available in a very compact design. The focus control, the distance sensor, and the focus adjustment form part of the focus module, not of the optoelectronic sensor. The focus module is therefore able to carry out focus adjustments independently, in particular to act as an autofocus module.

The invention has the advantage that a particularly great flexibility is achieved by the modularity. A decision can in particular be made in a reading tunnel whether the effort for an external distance measurement is required in a fast application or whether a laser scanner arranged upstream for the geometry determination can be dispensed with by the integrated distance measurement. The focus module can be separately developed, tested, and manufactured. Very compact focus adjustments and distance sensors and accordingly compact designs of the focus module are possible.

The focus module preferably has a circuit board, in particular a flex board, on which a driver circuit for the focus adjustment, the focus control, and the distance sensor are accommodated. Such a common circuit board for all the essential electronic elements of the focus module, or even for all of them, permits a particularly compact design. The focus module preferably also comprises a position sensor for detecting the position of the optics and thus the actually set focal position and such a position sensor can likewise advantageously be accommodated on the common circuit board.

The focus module preferably comprises an interface to the sensor to receive control data of the sensor and/or to transfer distance values of the distance sensor to the sensor. The sensor can thus communicate with the focus module and can, for example, set a focusing mode or specify a focal position. Conversely, the sensor has access to the distance value measured by the distance sensor, that is also of use for other purposes than the focus adjustment, for instance a lighting adaptation or to assist the image evaluation.

The focus control is preferably configured for an external focus mode in which at least one distance value is specified via the interface and the focal position correspondingly tracks the distance value. The focus module can be configured for operation in different modes. In this mode, external distance values are used in addition to or instead of the distance sensor's own distance values. This is possibly necessary in fast applications, for example at high conveying speeds where the autonomous refocusing would be too slow. The distance values are then already determined in advance, for example by a laser scanner disposed upstream, so that sufficient time remains until the actual image taking or code reading to set the suitable focal position.

The focus control is preferably configured for an autofocus mode in which distance values are measured continuously via the distance sensor and the focal position correspondingly tracks the distance values. The focus module here works as an independent autofocus module. The continuous measurement of distance values takes place in accordance with the required regulation rate. Further modes are conceivable in addition to the external focus mode and the autofocus mode, for instance a calibration mode in which the focus module is independently calibrated.

The focus adjustment unit preferably has a moving coil drive. A particularly light and compact focus module is thus possible. The moving coil drive can be operated by a control or regulation, with the focus module preferably comprising, for the regulation, the position sensor already mentioned above for the determination of the actual position of the optics. Alternatively to a moving coil drive, an adaptive lens such as a liquid lens or a gel lens is also conceivable, for example.

The focus adjustment unit preferably comprises a movable carrier element having the optics and comprises a fixed holding element that each have a surface, in particular having surfaces in parallel with one another, wherein the position of the movable carrier element is variable with respect to the holding element for the setting of a focal position and at least one rolled leaf spring that rolls on or off the surfaces during a movement of the movable carrier element is arranged between the carrier element and the holding element. The position of the movable carrier element is varied with respect to a fixed-position holding element for a setting of a focal position. The focus adjustment is based on a leaf spring that is arranged between the carrier element and the holding element and rolls on and off respective surfaces of the carrier element and the holding element. This kind of compact mechanical suspension enables large adjustment distances with a high long-term stability.

The carrier element preferably has an upper and a lower end abutment and the holding element has a damping element that projects between the end abutments. The end abutments bound the movement of the carrier element in a smallest or greatest deflection, above all in the currentless state in which the focus adjustment cannot counteract too large a deflection. The damping element absorbs the kinetic energy of the impacting carrier element. No escalation thus occurs and the focus module becomes more robust toward vibration/shock load.

In an advantageous further development, an optoelectronic sensor is provided having a light transmitter and/or a light receiver and at least one focus module in accordance with the invention associated with the light transmitter and/or the light receiver. The focus module is accordingly suitable for a focusing at the transmission side or at the reception side. A coaxial arrangement of the light transmitter and the light receiver is also conceivable where the focus module acts both as a transmission optics and as a reception optics or the use of two focus modules is conceivable for the transmission side and the reception side.

The sensor is preferably configured as a barcode scanner having the focus module before its light transmitter. With this use at the transmission side, the focus module bundles the reading beam of the barcode scanner onto the code distance. Alternatively, the sensor is configured as a camera having the focus module before its light receiver. In this application at the reception side, the focus module provides a focused imaging on the light receiver of the camera configured as an image sensor. The camera is preferably a camera-based code reader, that is it has an evaluation unit that locates and decodes the codes in the image data of the image sensor.

The invention will be explained in more detail in the following also with respect to further features and advantages by way of example with reference to embodiments and to the enclosed drawing. The Figures of the drawing show in.

Figure 1:
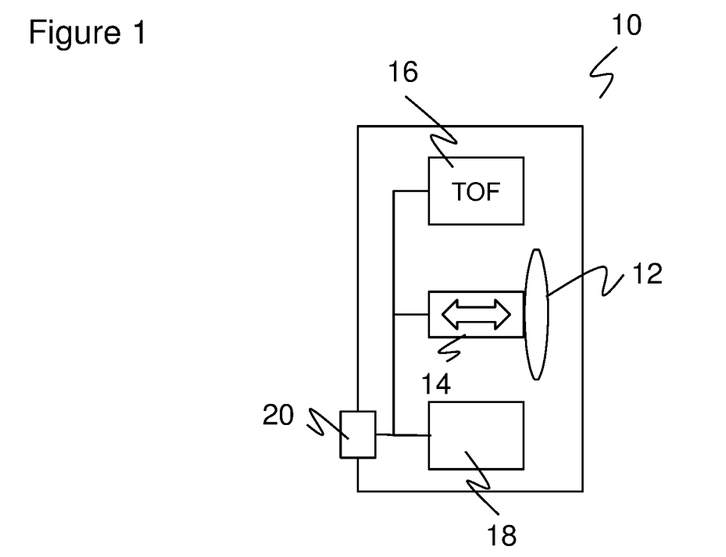
FIG. 1 a schematic representation of a focus module.

FIG. 1 shows a schematic representation of a focus module 10. An optics 12 is moved into a respective suitable focal position by means of a focus adjustment 14. Like all the elements shown in FIG. 1, the optics 12 is shown purely as an example and here as an individual lens. It is generally any desired objective composed of lenses and other optical elements such as diaphragms, prisms and the like that can optionally also be reflexive. The focus adjustment 14 acts, in accordance with the double arrow, by changing the lens position along the optical axis without thus precluding an alternative focus change, for instance by a focal length adjustment of an adaptive lens.

A distance sensor 16 measures distance values from which the respective focal position to be set can be derived, that is, for example, an object distance or a code distance. The distance sensor 16 is marked by TOF (time of flight), but can also use different measurement principles.

The focus module 10 furthermore has its own focus control 18 that is connected to the focus adjustment 14 and to the distance sensor 16. This enables a focus regulation or an autofocus mode in which respective distance values are measured and the focal position is set accordingly.

An interface 20 serves for the connection to an optoelectronic sensor in which the focus module 10 is used. External control commands can be received and the distance values of the distance sensor 16 can be output via it. The focus module 10 furthermore has a mechanical connector, not recognizable in the schematic representation, to fasten it to or release it from the sensor.

Figure 2:
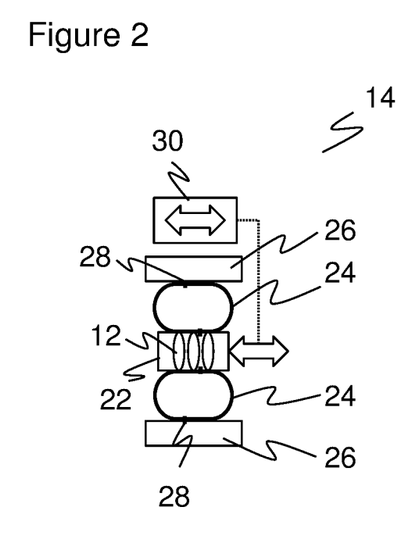
FIG. 2 an enlarged representation of a focus adjustment of the focus module.

FIG. 2 shows an advantageous embodiment of the focus adjustment 14 as a moving coil drive. The optics 12, that is symbolized by three lenses here, is located on a movable carrier element 22 that is clamped between a fixed holding element 26 at both sides by means of two rolled leaf springs 24. The movable carrier element 22 acts as an oscillator, the fixed position holding element 26 as a stator. The rolled leaf springs 24 are fastened to the movable carrier element 22 and to the holding element 26 with a respective fixing point 28. The fixing is also conceivable at additional points, but this shortens the possible adjustment path; or it can conversely also be omitted since the rolled leaf springs 24 are clamped by their spring force and the roll friction is smaller than the static friction. A force effect on the movable carrier element 22 in the direction of the longitudinal axis, that preferably corresponds to the optical axis of the optics 12, effects a rolling up or off of the rolled leaf springs 24. The respective adopted position is defined by the focus control 18 via a driver circuit 30. The point of engagement of the driver circuit or the direction arrow in FIG. 2 should be understood as purely functional and not as geometrical. The moving coil drive system preferably actually engages at the periphery of the carrier element 22 in order not to disrupt the light paths.

Alternatively to a moving coil drive system, other focus adjustments are also conceivable, for example an adaptive lens that varies its focal length by varying the optically effective contour, as with a liquid lens or gel lens.

Figure 3:
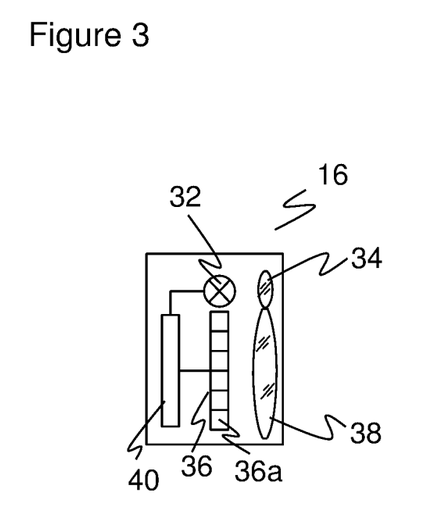
FIG. 3 an enlarged representation of a distance sensor of the focus module.

FIG. 3 shows an advantageous embodiment of the integrated distance sensor 16 as an optoelectronic distance sensor in accordance with the principle of the time of flight measurement. The distance sensor 16 comprises a TOF light transmitter 32 having a TOF transmission optics 34 and a TOF light receiver 36 having a TOF reception optics 38. A TOF light signal is thus transmitted and received again. A time of flight measurement unit 40 determines the time of flight of the TOF light signal and determines from this the distance from an object at which the TOF light signal was reflected back.

The design of the distance sensor 16 is purely exemplary. The optoelectronic distance measurement by means of time light processes is known and will therefore not be explained in detail. Two exemplary measurement processes are photon mixing detection using a periodically modulated TOF light signal and pulse time of flight measurement using a pulse modulated TOF light signal. There are also highly integrated solutions here in which the TOF light receiver 36 is accommodated on a common chip with the time of flight measurement unit 40 or at least parts thereof, for instance TDCs (time to digital converters) for time of flight measurements. In particular a TOF light receiver 36 is suitable for this purpose that is designed as a matrix of SPAD (single photon avalanche diode) light reception elements 36a. The TOF optics 34, 38 are shown only symbolically as respective individual lenses representative of any desired optics such as a microlens field. It is alternatively conceivable that the distance sensor 16 measures distances using a different optical or non-optical principle.

Figure 4A:
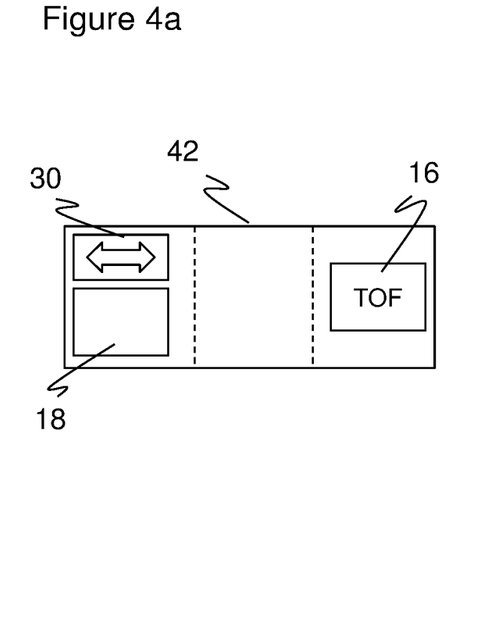
FIG. 4a a schematic representation of an unfolded common circuit board having the essential electronic elements of the focus module.

FIG. 4a shows an unfolded common circuit board 42 of a particularly advantageous embodiment. The common circuit board 42 is preferably configured as a flexible board, for example a rigid flex circuit board. The distance sensor 16, the focus control 18, and the driver circuit 30 are accommodated on the common circuit board 42.

Figure 4B:
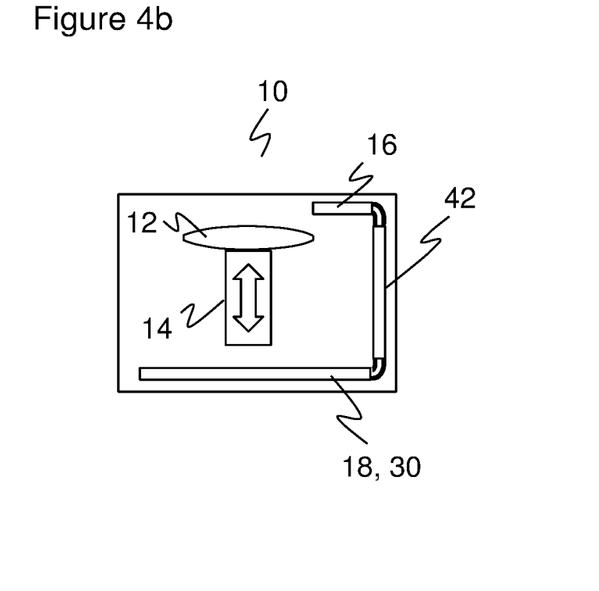
FIG. 4b a schematic representation of the arrangement of the circuit board in the focus module.

FIG. 4b shows the arrangement of the common circuit board 42 in the focus module 10. It is folded such that the electronics for the regulation, that is the focus control 18 and the driver circuit 30, are located on the lower side of the focus module 10. The distance sensor 16, that has to be able to detect the field of view of the optics 12, is in contrast located on the upper side. A position sensor, not shown, for the respective position of the optics 12 can be provided at the side.

The circuit board 42 can in particular have even further electronic elements in its lower region. They include general elements such as memories or supply units and the interface 20. No further circuit board is necessary in the ideal case. A central opening in the lower region of the circuit board 42 that enables the passage of light through the optics 12 and the focus module 10 is not recognizable in the schematic sectional view of FIG. 4b.

Further sensors are conceivable on the circuit board 42, for instance a temperature sensor or an acceleration sensor. The respective position of the optics 12 is corrected via the temperature in dependence on the temperature. The acceleration sensor serves for the analysis of the application situation to adapt a regulation, for example. Depending on the situation, for example, the response time or the position stability is optimized in external controls. If there are currently no special demands in this respect, the regulation can optimize the power consumption.

Figure 5:
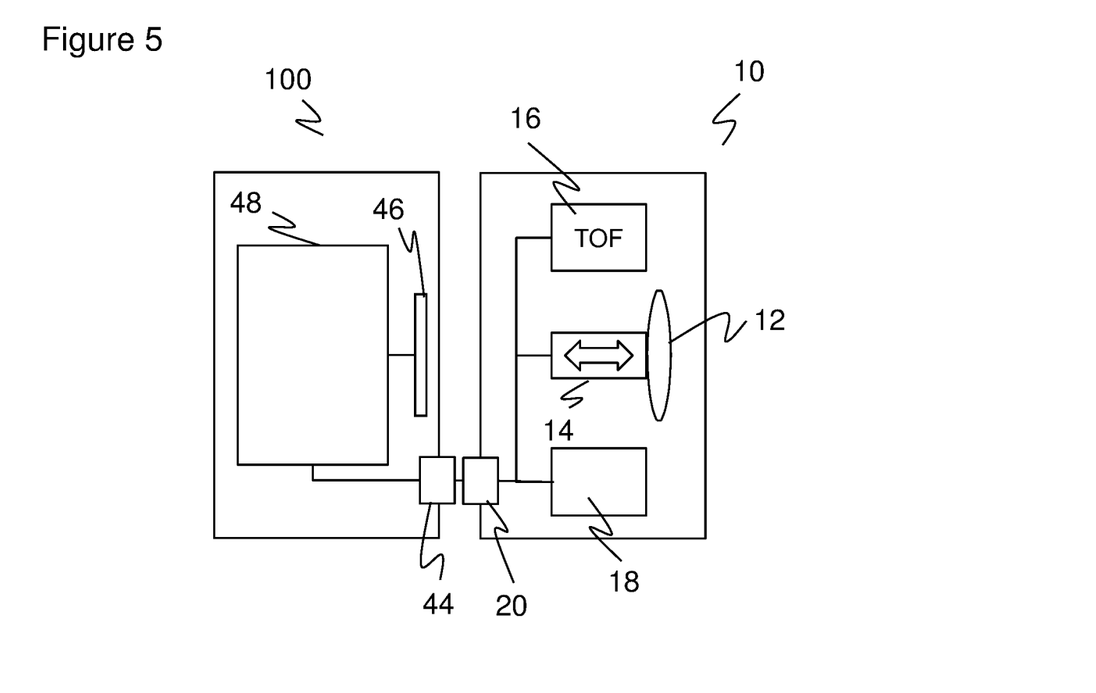
FIG. 5 a schematic representation of a camera with a focus module.

FIG. 5 shows a block diagram of a camera 100 as an example of an optoelectronic sensor having a focus module 10 connected at the reception side.

The connection takes place mechanically, on the one hand, by releasable connection elements and, on the other hand, via the interface 20 and a corresponding interface 44 of the camera 100. The received light is guided by the optics 12 onto an image sensor 46 of the camera 100.

A camera control 48 is connected to the image sensor 46 and is responsible for the control work, the evaluation work, and for other coordination work in the camera 100. It therefore triggers image recordings, reads image data of the image sensor 46 to store them, to process them, to output them to an external interface, not shown. The camera control 48 is preferably able to locate and decode code regions in the image data so that the camera 100 becomes a camera-based code reader. Other image processing processes are, however, also conceivable, for example for inspection and measurement work (machine vision).

The focus module 10 is autonomous or independent in the sense that it can take care of the focusing independently of the camera control 48. The camera control 48 is nevertheless preferably in communication with the focus control 18 via the interfaces 20, 44. This makes different operating modes possible. A preferred operating mode is an autofocus mode in which the focus control 18 independently sets the associated focal position of the optics 12 using the distance values of the distance sensor 16. In this respect, the distance values can also be output to the camera control 48 that thus satisfies further tasks such as the setting of exposure times, a separate active illumination for an image brightness control, and the like. Another operating mode is an external focusing mode in which the distance values or the corresponding focal positions of sensors such as a laser scanner externally connected to the camera 100 are now specified for the focus control 18. The focus module 10 is no longer completely autonomous in this external focus mode; however, it preferably also provides even greater flexibility. Further operating modes are conceivable such as an autonomous calibration of the focus module 10.

The camera 100 is only an example of an optoelectronic sensor for the use of the focus module 10. The focus module 10 works at the reception side here. Alternatively, a focusing at the transmission side is also conceivable; for instance to focus an illumination pattern or to set the reading beam of a barcode scanner to a code distance. In further embodiments of an optoelectronic sensor, the same focus module 10 serves the focusing both at the transmission and at the reception side or two focus modules 10 are provided for this purpose.

Figure 6:
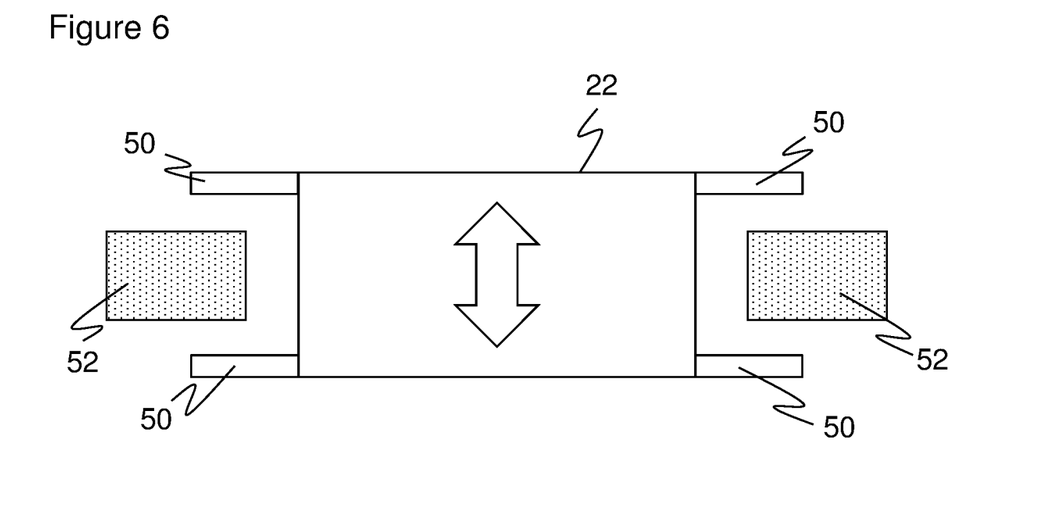
FIG. 6 a schematic representation of a carrier element of a focus adjustment with a bounding and damping of the deflection.

In a view of the moving carrier element 22, FIG. 6 illustrates a damping for protection from external deflections, in particular on shock and vibration loads. The mass of the carrier element 22 and the optics 112, that is supported via leaf springs 24 having a certain spring stiffness, forms a classical spring-mass damper system. In the currentless state, in particular during transport, the focus control 18 cannot counteract an external acceleration. To prevent damage to the focus module 10 and to enable a transport, end abutments 50 are provided at the carrier element 22. In the maximum or minimum deflection of the carrier element 22, these end abutments impact a damper 52 fastened to the holding element 26. The dampers 52 are manufactured from a damping material such as rubber and absorb the energy from shocks and vibrations of the carrier element 22. To set the damping characteristics, suitable materials (inter alia Shore hardness) or material composites, for instance with two types of rubber or a rubber-metal composite, and shapes are selected. The shape and material of the typically hard end abutments 50 can also be varied. The horizontal distance between the carrier element 22 and the dampers 52 limits deformations on a transverse load.

Figure 7:
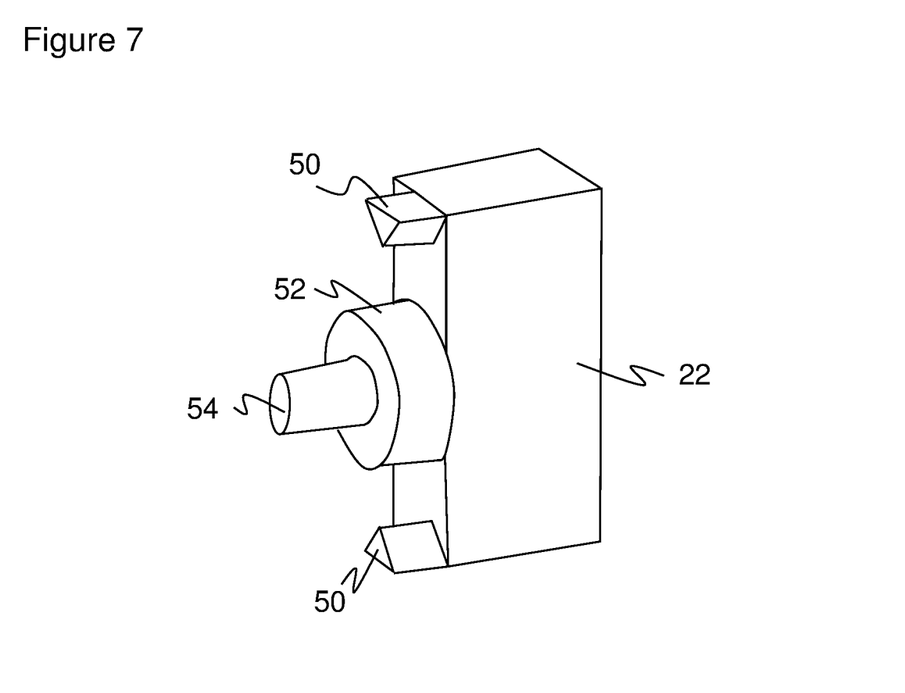
FIG. 7 a three-dimensional representation of an alternative embodiment of a bounding and damping of the deflection of the carrier element.

FIG. 7 illustrates a varied embodiment of the damping. The end abutments 50 are triangular in this case. The damper 52 is fastened to the holding element 26 via a grub screw 54, with the corresponding opening being seated centrally or eccentrically in the damper 52. With a different fastening, for instance by adhesive bonding, the damper 52 and selectively likewise have an opening or be completely filled.

Figure 8:
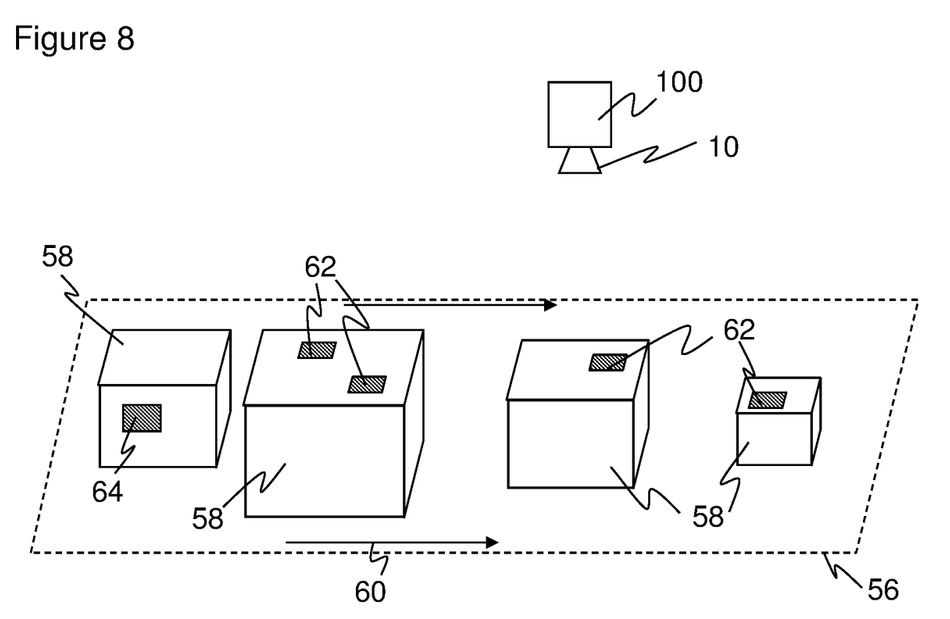
FIG. 8 a representation of an application situation of a camera having a focus module installed at a conveyor belt.

FIG. 8 shows a possible use of the sensor 100 in installation at a conveyor belt 56 that conveys objects 58, as indicated by the arrow 60, through the detection region of the sensor 100. The objects 58 can bear code regions 62 at their outer surfaces. It is the object of the sensor 100 to detect properties of the objects 58 and, in a preferred use as a code reader, to recognize the code regions 62, to read and decode the codes applied there, and to associate them with the respective associated object 58. In order also to recognize laterally applied code regions 64, additional sensors, not shown, are preferably used from different perspectives.

The invention claimed is:

1. A focusing device for an optoelectronic sensor, the focusing device comprising:
    a focus-adjustable optics;
    a focus adjustment unit for varying a focal position of the focus-adjustable optics;
    a distance sensor for determining a distance value; and
    a focus control to move the focus-adjustable optics into a focal position corresponding to the distance value by means of the focus adjustment unit,
    wherein the focusing device is configured as an autonomous focus module, the focus module taking care of the focusing independently of a control of the optoelectronic sensor in that focus adjustments are carried out independently, and wherein the focusing device can be retrofitted to the optoelectronic sensor by means of releasable connection elements or can be replaced with another focus module, with the focus adjustment unit, the focus control, and the distance sensor being parts of the focus module,
    wherein the focus adjustment unit comprises a movable carrier element having the focus-adjustable optics and a fixed holding element that each have a surface, and
    wherein a position of the movable carrier element is variable with respect to the fixed holding element for a setting of the focal position, wherein at least one rolled leaf spring is arranged between the movable carrier element and the fixed holding element that rolls on or off the surfaces thereof during movement of the movable carrier element.

2. The focusing device in accordance with claim 1, wherein the distance sensor is an optoelectronic distance sensor in accordance with the principle of the time of flight process.

3. The focusing device in accordance with claim 1, further comprising a circuit board on which a driver circuit for the focus adjustment, the focus control, and the distance sensor are accommodated.

4. The focusing device in accordance with claim 1, wherein the circuit board is a flex board.

5. The focusing device in accordance with claim 1, further comprising an interface to the sensor to receive control data of the sensor and/or to transfer distance values of the distance sensor to the sensor.

6. The focusing device in accordance with claim 5, wherein the focus control is configured for an external focus mode in which at least one distance value is specified via the interface and the focal position correspondingly tracks the distance value.

7. The focusing device in accordance with claim 1, wherein the focus control is configured for an autofocus mode in which distance values are measured continuously via the distance sensor and the focal position correspondingly tracks the distance values.

8. The focusing device in accordance with claim 1, wherein the focus adjustment unit has a moving coil drive.

9. The focusing device in accordance with claim 1, wherein the movable carrier element has an upper and a lower end abutment and the fixed holding element has a damping element that projects between the end abutments.

10. An optoelectronic sensor comprising at least one of a light transmitter and a light receiver and at least one focusing device, with the focusing device being associated with the light transmitter and/or the light receiver, the focusing device comprising:
a focus-adjustable optics;
a focus adjustment unit for varying a focal position of the focus-adjustable optics;
a distance sensor for determining a distance value; and
a focus control to move the focus-adjustable optics into a focal position corresponding to the distance value by means of the focus adjustment unit,
wherein the focusing device is configured as an autonomous focus module, the focus module taking care of the focusing independently of a control of the optoelectronic sensor in that focus adjustments are carried out independently, and wherein the focusing device can be retrofitted to the optoelectronic sensor by means of releasable connection elements or can be replaced with another focus module, with the focus adjustment unit, the focus control, and the distance sensor being parts of the focus module,
wherein the focus adjustment unit comprises a movable carrier element having the focus-adjustable optics and a fixed holding element that each have a surface, and
wherein a position of the movable carrier element is variable with respect to the fixed holding element for a setting of the focal position, wherein at least one rolled leaf spring is arranged between the movable carrier element and the fixed holding element that rolls on or off the surfaces thereof during movement of the movable carrier element.

11. The sensor in accordance with claim 10, wherein the optoelectronic sensor is configured as a barcode scanner, the barcode scanner having said light transmitter, with the focusing device being arranged in front of its light transmitter.

12. The sensor in accordance with claim 10, wherein the optoelectronic sensor is configured as a camera, the camera having said light receiver, with the focusing device being arranged in front of its light receiver.

13. The sensor in accordance with claim 12, wherein the camera is a camera-based code reader.

* * * * *